Patented July 24, 1934

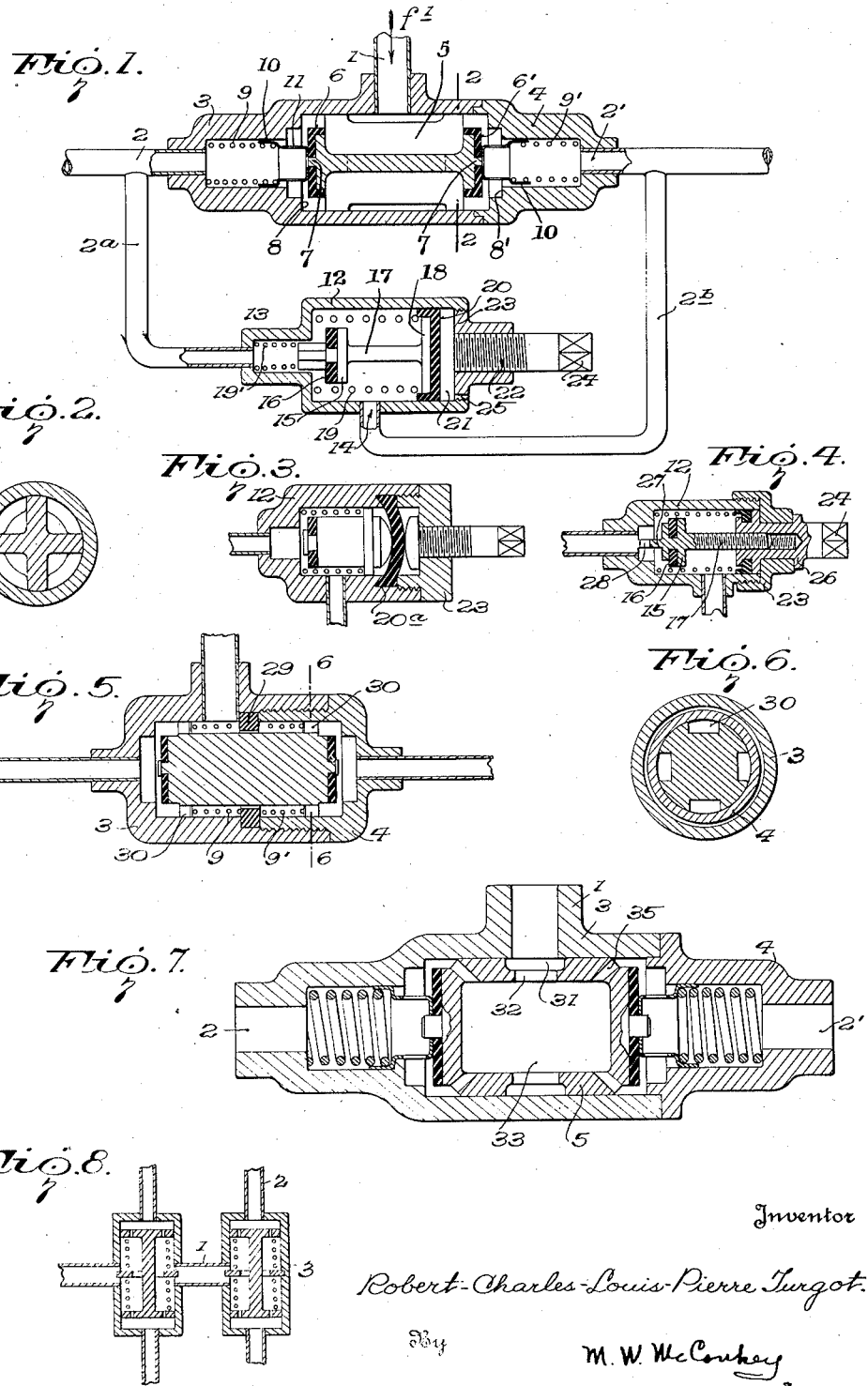

1,967,383

UNITED STATES PATENT OFFICE 1,967,383

FLUID PRESSURE APPARATUS

Robert Charles Louis Pierre Turgot, Paris, France, assignor to Bendix Brake Company, South Bend, Ind., a corporation of Illinois Application May 26, 1931, Serial No. 540,128
In France May 26, 1930

1 Claim. (Cl. 303—84)

This invention relates to brakes and more particularly to brake systems of the hydraulic type.

It is well-known that in hydraulic braking systems comprising a number of circuits, all of which are fed from a common pressure-producing device, a leak occurring in any one of the circuits will render the entire system ineffective by draining therefrom the pressure-transmitting liquid. It has, therefore, heretofore been proposed to provide means in each separate conduit for shutting off from the rest of the system any conduit in which a leak may occur.

It is an object of the present invention to provide an improved device for shutting off from the remainder of the system, any part connected therein in which a leak has occurred.

Another object of the invention is to provide a unitary device for controlling the flow in a plurality of circuits of a hydraulic system.

Another object of the invention is to provide a unitary device, operable upon the reduction of pressure in any one of a plurality of conduits, for closing off said conduit from the rest of the system.

A further object of the invention is to provide means for equalizing the pressure in a plurality of conduits forming parts of a hydraulic system.

A still further object of the invention is to provide a balanced valve means for a fluid-retaining device, in which the valve means is balanced by the pressure of fluid in the system whereby the reduction of pressure in one conduit will cause the unbalancing of the valve to shut off that conduit.

Other objects and features of novelty will be apparent from the following detailed description when taken in connection with the accompanying drawing. It is to be expressly understood however that the drawing is for purposes of illustration only and is not designed as a definition of the limits of the invention, reference being had for this purpose to the appended claim.

In the drawing wherein similar reference characters refer to like parts throughout the several views:

Fig. 1 is a lengthwise section of an apparatus according to the invention for the hydraulic control of motor vehicle brakes provided with two circuits, comprising means for optional connection between the two circuits.

Fig. 2 is a section on the line 2—2 of Fig. 1.

Figs. 3 and 4 show two modifications of the said means for optional connection.

Fig. 5 is a modification of the device shown in Fig. 1.

Fig. 6 is a cross-section on the line 6—6 of Fig. 5.

Fig. 7 shows another modification of the device represented in Fig. 1.

Fig. 8 is a diagrammatic view showing a method of coupling a plurality of the devices according to the invention in the case of a certain number of circuits.

In the form of construction shown in Figs. 1 and 2, the fluid under pressure is supplied by a pump or by a compressor, or from a suitable tank, through a main conduit 1. This fluid is intended for use in the devices under control, or it may reach any operating points, by means of the pipes 2—2'. The pipe 2 leads for example to the rear brakes of a motor vehicle, and the pipe 2' to the front brakes.

The main conduit 1 is connected with the central part of a cylindrical body 3, which is closed by a cap 4. The two pipes 2 and 2' are connected respectively with the restricted end of the cylindrical body 3 and to the outer end of the cap 4.

In the said body 3 is slidable a balanced double valve whose central part consists of guiding flanges 5. The two ends, adapted for closing purposes, are provided with packing which may consist of cup-shaped members 6—6' of india rubber or the like, which can be held in place by nibs 7.

The said double valve is normally separated from its seats 8—8' provided in the body 3 and in the cap 4, by calibrated springs 9—9' which have exactly the same force, said springs are preferably in direct contact with the packing 6—6', as herein represented, by means of end-pieces 10 pierced with holes 11.

The apparatus is optionally completed, as shown, by an auxiliary device which serves to connect together the two pipes 2 and 2'. Said device consists for example of a cylindrical body 12, whereof one end 13 is connected by a pipe 2ª with the said pipe 2; the second pipe 2' is connected with the middle of the cylindrical body at 14 by means of a pipe 2ᵇ. The connection between the pipes 2 and 2' is controlled by a valve 15, provided with packing 16, said valve being connected by a rod 17 with a disk 18. Springs 19 and 19¹ urge said disk to the right and tend to lift the valve from its seat. By the action of the springs 19 and 19¹ the disk 18 can be pressed against a piston 21, through the medium of a packing member 20, said piston being mounted on the end of a threaded rod 22 screwed into a plug 23 mounted on the said body 14. Said rod has a square or hexagonal end 24 by which it can be operated, and with it the piston 21. An aperture 25 connects the interior of the said body with the atmosphere in the rear of the piston 21.

The operation is as follows: When the apparatus is to be started, the first operation consists in the filling of the pipes 2 and 2' and the discharge of the air which they contain. The square part 24 and the threaded rod 22 are used to bring the piston 21 to the end of its right-hand stroke. By the action of the springs 19 and $19^1$, the valve 15 is raised from its seat, thus connecting together the pipes 2 and 2'. The pump or compressor is then operated in the usual manner; the liquid enters at $f^1$, passes freely around the double valve 5 which is now separated from its two seats, and circulates in the pipes 2 and 2' in which the pressures are the same, due to the fact that said pipes are connected together by the cylinder 12 and the pipes $2^a$—$2^b$. When the filling operation has been completed, the circulation through the cylinder 12 is cut off by screwing in the rod 22; this latter drives before it the piston 21 and packing 20, thus pushing the disk 18 and finally the valve 15, while the springs 19 and $19^1$ are compressed. A pressure per cubic centimeter will thus prevail in the whole set of conduits which is equal to the force of the retaining spring of the operating pump.

If a leak should now occur for instance in the circuit of the pipe 2' the pressure in this circuit will be reduced to atmospheric pressure, while it will maintain its value in the circuit of the pipe 2. The double valve 5 is now driven to the right, due to the reduction of the pressure on its face 6'. The apparatus will be unbalanced to a still greater degree if the leak occurs during the breaking, as the liquid has no discharge in the pipe 2 and hence on the face 6 of the valve 5, and it will thus rapidly attain a high pressure in the corresponding circuit, whilst in the circuit supplied by the pipe 2' the pressure can never exceed atmospheric pressure, as there is a communication with the exterior.

The inverse operation will take place if the leakage occurs in the pipe 2 or in the circuit or devices which it supplies.

It is obviously necessary to give the proper form to the double valve 5 and to its packing members, and to provide suitable flow section below the said valve.

In the construction shown in Fig. 3, wherein there is shown an alternative auxiliary device connecting pipe 2 and 2', the large packing member 20 situated between the piston 22 and the disk 18 connected with the valve 15, is replaced by a packing member $20^a$ which is fixed in position and is tightly pressed between the cylinder 12 and its plug 23.

In the modification shown in Fig. 4 wherein there is shown another alternative auxiliary device connecting pipe 2 and 2' a recessed nut 26 formed in one with a square operating head 24 is rotatable while held against lengthwise motion, in a cover or cap 23 mounted on the cylinder 12. A threaded rod 17, having at one end the valve 15 with its packing 16, is screwed into the nut 26; said rod is held against rotation by suitable mechanical means such as a flat part 27 slidable by easy friction in a slot 28 in the cylinder 12. Thus by simply turning the said nut 26 the valve 15 can be applied upon its seat or raised therefrom.

The device connecting together the pipes 2 and 2' may obviously have other constructions than those represented in Figs. 1 to 3, and it may chiefly consist of a plug cock or other closing device corresponding to the requirements of operation as above described.

It should be observed that the said connecting device is not essential for the proper working of the apparatus acting against leakage, and this device only serves to complete the apparatus and to make it capable of being bled easily.

A modified arrangement of the reaction springs used with the double valve 5 is shown in Fig. 5. A two-part disk 29 is held between the cylinder 3 and its cover or cap 4. The two springs 9—9' are in tact at one end with said disk and at the other end with the ribs 30 serving to guide the said valve.

Another modification is shown in Fig. 7 and this relates chiefly to the form of the double valve 5. The liquid enters through an annular space 31 and proceeds through holes 32 into the interior 33 of the valve 5; it issues from said space through holes 35. This form may be necessary in certain cases, but it is obviously only given by way of example.

Fig. 8 shows, by way of example, two valves of the type shown in Fig. 5 which are coupled together for use with four circuits, and it is evident that any suitable number of the valves may be coupled in an analogous manner.

The different lines of piping may be branched together either as a whole or as concerns certain of the pipes alone, by the use of one or more cocks or valves as shown in Figs. 1, 3 and 4.

While there have been shown and described several embodiments of the invention, it is to be understood that the invention is not limited thereto. Various changes in the shapes, sizes and manner of assembling the various component parts may be resorted to without departing from the scope of the invention, as will occur to those skilled in the art. Reference will therefore be had to the appended claim for a definition of the limits of the invention.

What is claimed is:

For a hydraulic system a valve comprising a casing having an end opening and a side opening, a plug fastened in the end of said casing opposite to said end opening and formed with a threaded recess on the inner side thereof extending only partially through said plug, a resilient cup associated with the inner end of said plug for preventing the passage of fluid outward past said plug, a threaded stem extending into said recess, a guide member for preventing said threaded stem from rotating, a packing associated with said stem adapted to close said end opening, and means associated with said plug whereby said plug may be rotated to move said stem and said packing longitudinally of said cylinder.

ROBERT CHARLES LOUIS PIERRE TURGOT.